United States Patent [19]

Helm et al.

[11] Patent Number: 4,980,994

[45] Date of Patent: Jan. 1, 1991

[54] CLAMPING FIXTURE FOR DETACHABLY PARTICULAR A DISC

[75] Inventors: Winfried Helm; Manfred Stäbler, both of Leinfelden-Echterdingen, Fed. Rep. of Germany

[73] Assignee: Robert Bosch GmbH, Stuttgart, Fed. Rep. of Germany

[21] Appl. No.: 378,239

[22] PCT Filed: Nov. 28, 1987

[86] PCT No.: PCT/DE87/00552

§ 371 Date: May 26, 1989

§ 102(e) Date: May 26, 1989

[87] PCT Pub. No.: WO88/04975

PCT Pub. Date: Jul. 14, 1988

[30] Foreign Application Priority Data

Dec. 24, 1986 [DE] Fed. Rep. of Germany ..... 36444440

[51] Int. Cl.$^5$ ............................................. B24B 41/00
[52] U.S. Cl. .................................. 51/168; 51/206 R; 51/209 R
[58] Field of Search ................. 51/168, 376, 377, 378, 51/206 R, 209 R

[56] References Cited

U.S. PATENT DOCUMENTS 4,637,170 1/1987 Block .................................... 51/168

FOREIGN PATENT DOCUMENTS 118872 9/1918 United Kingdom .

Primary Examiner—Frederick R. Schmidt
Assistant Examiner—M. Rachuba
Attorney, Agent, or Firm—Michael J. Striker

[57] ABSTRACT

A clamping fixture for detachably fixing a disc-like tool to a spindle in cooperation with a tool-fixing member, and comprising a flange member for clamping the tool between the flange member and the tool-fixing member and a supporting element for attaching the flange member to the spindle in a torque-transmitting relationship and having an annular part, the flange member being axially and rotationally displaceable relative to said annular part, the annular part having a first end surface to be axially supported on the spindle and a second end surface and the flange member having an end surface bearing on the second end surface of the annular part with the second end surface of the annular part and the end surface of the flange member having a plurality of complementary sloping end surface portions inclined toward the spindle axis and defining a wedge angle having a size lying in a self-locking range, and the annular part including a plurality of stop surfaces extending substantially parallel to the spindle axis adjoining a respective sloping end surface portions of the second end surface at lower ends of thereof end portions and a plurality of drive surfaces extending parallel to respective stop surfaces in spaced relationship thereto and arranged in front of upper ends of respective sloping end portions of the second end surface, the flange member having a respective plurality of stop dogs defining locking surfaces engaging respective stop surfaces of the annular part upon the axial displacement of the flange member and relief of the clamping pressure, and a respective plurality of surfaces engageable by respective drive surfaces of the annular part when the tool is clamped between the flange member and the tool-fixing member.

11 Claims, 2 Drawing Sheets

1

CLAMPING FIXTURE FOR DETACHABLY PARTICULAR A DISC

BACKGROUND OF THE INVENTION

The invention relates to a clamping fixture for detachably fixing a tool, in particular a disc. Clamping fixtures, in particular for disc-shaped tools are suitable particularly for portable power hand tools, and in this respect in particular for grinding hand power tools. A clamping fixture has been disclosed (German Patent Specification No. 3,012,836) in which one flange, which is arranged on the side of the tool pointing towards the housing of the power hand tool, is displaceable relative to the spindle and is coupled to the latter in such a way as to transmit torque. In this arrangement, this rear supporting flange is supported against axial displacement in an axial end position via a spindle shoulder forming a supporting element for the supporting flange. The other flange, which can be screwed onto the end of the spindle, consists of a nut having a separate clamping element which has a roughly hat-shaped cross-section and is supported axially against the flange of the clamping nut via a coil spring. When this clamping nut is screwed on and tightened, the pot-shaped clamping element is pressed axially against the tool via an axially compressed spring, and the tool is thereby tightened against the flange on the spindle side, the end face of a cylindrical extension of the clamping nut coming to bear directly on a facing axial side of the rear flange and, during further tightening of the clamping nut, this rear flange on the spindle side being tightened together with the clamping nut, if necessary until the rear flange comes to bear axially on the spindle shoulder surface forming the supporting element. In an angle grinder, the grinding disc is thereby supposed to be mounted with a predetermined contact pressure, and this contact pressure, is supposed to be ensured. This clamping fixture is also intended to enable a quick and simple exchange of the grinding disc and, at the same time, avoid overloading of the power hand tool, in particular the angle grinder. This is because, if the torque acting on the grinding disc is too great, the grinding disc stops, while the rear flange and also the clamping nut having the clamping member perform a relative movement thereto. The effect of the clamping nut automatically tightening further in operation, which otherwise makes it considerably more difficult to loosen the clamping nut when changing the grinding disc, is counteracted with this clamping fixture. Nonetheless, loosening of the clamping nut is here only possible with the assistance of a special auxiliary tool, the spindle, depending on the design of the machine, having to be appropriately counterheld by a second auxiliary tool, e.g. a spanner.

SUMMARY OF THE INVENTION

The object of the invention is to make possible a tool change without any auxiliary tool, which tool change, in addition, can be performed quickly and safely. A further advantage is that powered hand tools already existing can also be changed over without considerable redesign. For example, a simple substitution of the existing rear supporting flange for an annular part having an adapted flange is sufficient for this purpose. The front clamping nut is taken over unchanged in a known manner so that recourse can be made here to standardized, cost-effective parts. At the same time, it is still possible in especially stubborn cases, e.g. in the event of a rusted-in clamping nut, for a spanner to be placed thereon, and the clamping nut can be released with this auxiliary tool. The rear annular part is in a rotationally fast, positive-locking connection with the spindle so that relevant regulations are complied with. Furthermore, it is of advantage that the clamping fixture is not arranged on the working side of the tool but in the area between the tool and the bearing flange on the housing side, so that any risk of damage, e.g. chafing on the workpiece, is countered. This also avoids an axial projection on the working side of the tool, which axial projection could impair the work.

The novel features which are considered as characteristic for the invention are set forth in the appended claims. The invention itself, however, both as to its construction so to its mode of operation, together with additional objects and advantages thereof, will be best understood from the following description of preferred embodiments with reference to the accompanying drawings.

DESCRIPTION OF THE PREFERRED EMBODIMENT

Figure 1:
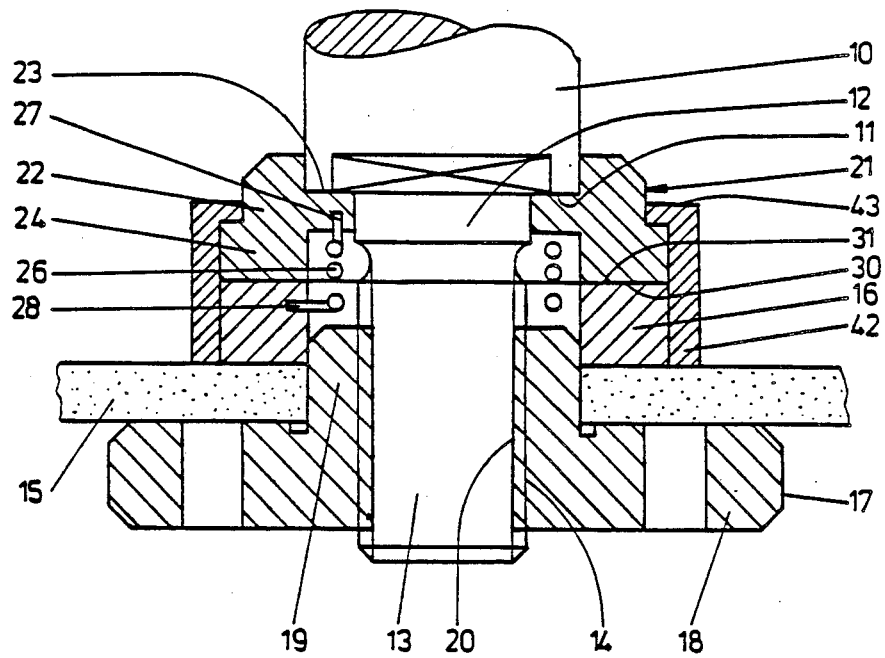
FIG. 1 shows schematically an axial longitudinal partial cross-sectional view of a clamping fixture according to the invention as part of an angle grinder having a mounted grinding disc.

FIG. 1 schematically shows the lower part of a portable power hand tool which is designed, for example, as an angle grinder and has a spindle 10 which is motor-driven via a gearing and, at the end, merges via an annular shoulder 11 into a cylindrical step 12 of smaller diameter and then into an end-side threaded step 13 having an external thread 14. The spindle 10 serves to drive a tool 15 which consists, for example, of the grinding disc indicated or another tool disc, a rubber plate or the like. The tool 15 is mounted axially and clamped in place between two flanges 16 and 17. The flange 17 thereof sitting on the spindle end is designed as a conventional clamping nut 18 which has a hub part 19, adjoining the flange, and is provided with a through internal thread 20 in the interior with which the clamping nut 18 is screwed onto the threaded step 13. The tool 15, during fixing, is centered on the outer peripheral surface of the hub part 19.

The other flange 16 is displaceable relative to the spindle 10 and, in a manner yet to be described, is coupled to the spindle 10 in such a way as to transmit torque. It is secured against axial displacement via a supporting element 21 and, relative to the latter, can be relieved of the clamping pressure for the tool 15. The supporting element 21 consists of an annular part 22 which in cross-section is roughly in the shape of an inverted pot and has a base 23 and a cylindrical part 24. With the base 23, the annular part 22 is supported axially against the annular shoulder 11 and centered radially on the cylindrical step 12. Owing to matching shaped surfaces, e.g. two flats parallel to one another, on the spindle 10 and in the base 23, the annular part 22 is in a rotationally fast, positive-locking connection with the spindle 10, which drives it along in a rotationally fast manner in the direction of rotation according to arrow 25 when the motor is switched on.

Figure 2:
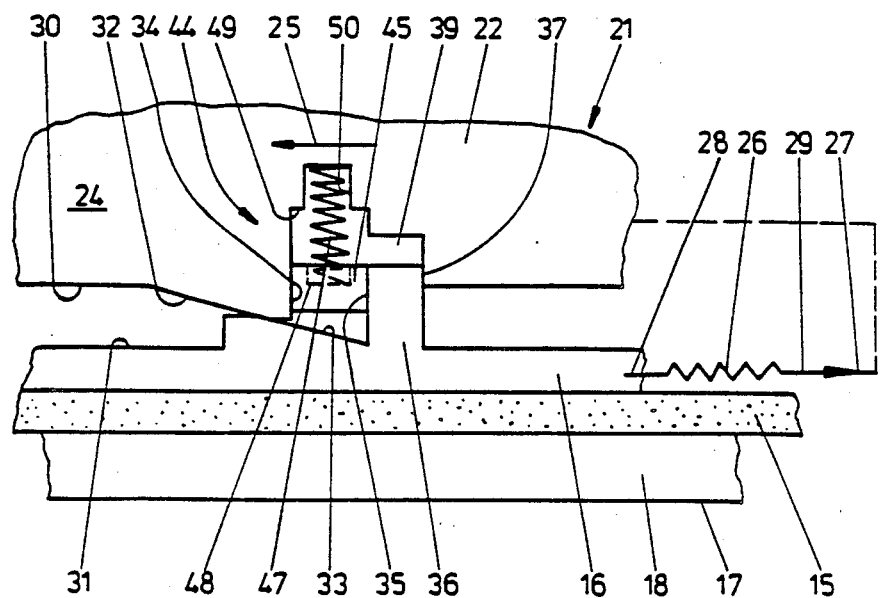
FIG. 2 shows schematically an enlarged side view, of a detail of the clamping fixture according to the invention with a tool clamped in place.
Figure 3:
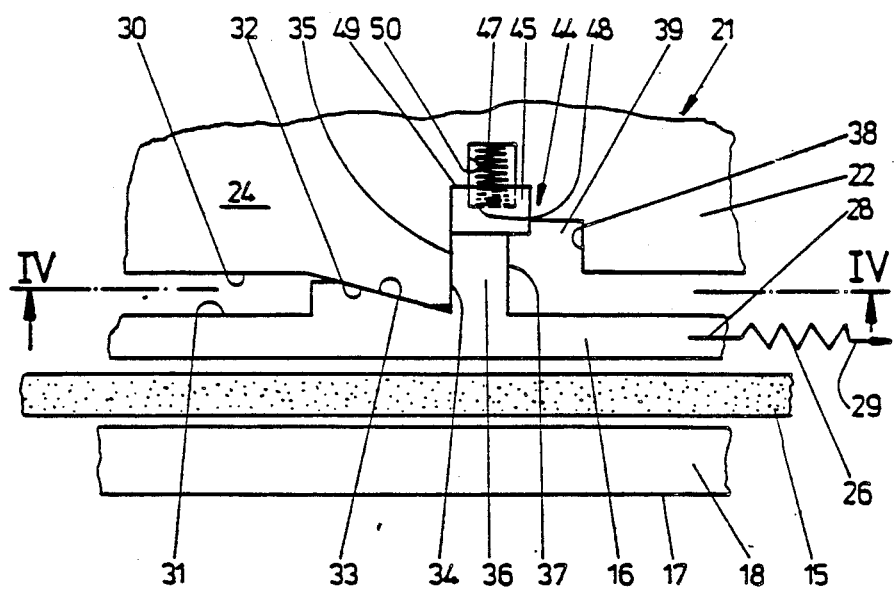
FIG. 3 shows a side view corresponding to that in FIG. 2, but with a loosened tool.

The flange 16 essentially consists of a relatively flat disc. With regard to the spindle 10, it is axially displaceable and rotatably held within limits on the outer peripheral surface of the hub part 19. The annular part 22 and the flange 16 are coupled by a spring 26 which is here designed as a torsion spring and of which one end 27 acts on the annular part 22 and the other end 28 acts on the flange 16. In FIGS. 2 and 3, for the purpose of clarification, a spring is instead only shown schematically, which spring acts with the end 18 on the flange 16 and loads the latter in a spring-elastic manner relative to the annular part 22 in the direction of the arrow 29 indicated.

On the end faces 30 and 31 facing one another axially, the annular part 22 and the flange 16 respectively have a plurality of sloping surfaces 32 and 33 respectively, e.g. three, which follow one another in the peripheral direction and are inclined to the left and with which the flange 16 and the annular part 22 bear axially against one another. In this arrangement, the sloping surfaces 32 of the annular part 22 are located on the end face 30, pointing towards the flange 16, of the cylindrical part 24.

The wedge angle of both sloping surfaces 32, 33 is selected to be of such a size that it lies in the self-locking range. A step surface 34 directed parallel to the axis in each case adjoins the respective sloping surface 32 of the annular part 22 towards the top wedge end. During the movement of the flange 16 relative to the annular part 22 towards the wedge bottom of the sloping surfaces 32, 33 and during the axial relief, consequently accompanying this movement, of the clamping pressure, the flange 16, in each case with locking surfaces 35 allocated to the step surfaces 34, strikes against the step surfaces with the pivoting angle being limited. FIG. 3 shows this state, in which the clamping fixture is released and thus the screwed-on flange 17 is relieved of the axial clamping pressure exerted on the tool 15 by the flange 16.

The flange 16 has stop dogs 36 which adjoin the respective sloping surface 33 at its end located towards the wedge bottom and are directed parallel to the axis and whose end face adjacent to the sloping surface 33 is in each case designed as a locking surface 35. The opposite end face of each stop dog 36 of the flange 16 is designed as an engaging surface 37 roughly parallel thereto. The annular part 22 has driving surfaces 38 which are located in front of each sloping surface 32 in the peripheral direction, are roughly parallel to the axis and, when tool 15 is clamped (FIG. 2), in each case strike against an allocated engaging surface 37 of the stop dog 36 while driving the flange 16 along.

The step surfaces 34 and driving surfaces 38, running at a distance therefrom in the peripheral direction, of the annular part 22 are formed by the two end faces of respective catch recesses 39 which consist of apertures in the wall of the cylindrical part 24. The catch recesses 39 adjoin each sloping surface 32 at its end towards the wedge top and are open axially and in the direction of the flange 16. In this arrangement, the opening width, measured in the peripheral direction, of each catch recess 39 is greater than the width of each stop dog 36 engaging therein.

Figure 4:
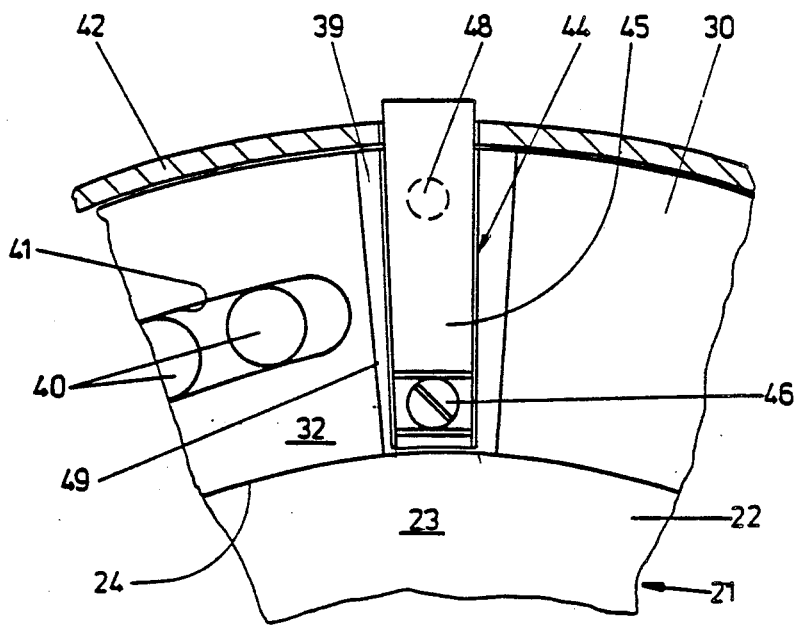
FIG. 4 shows schematically a partially cross-sectional plan view along the line IV—IV in FIG. 3.

As shown in particular by FIG. 4, rolling bodies 40 are arranged between the sloping surfaces 32 and 33, bearing axially against one another, of the annular part 22 and the flange 16, which rolling bodies 40 turn the sliding friction between the sloping surfaces 32, 33 into a roller friction and thus substantially reduce the friction. The rolling bodies 40 here consist of balls which are inserted into recessed grooves 41 in the sloping surfaces 32.

The flange 16 is fixed to, e.g. screwed into, a cylindrical sleeve 42 which surrounds it. The cylindrical sleeve 42 also extends axially over the cylindrical part 24 of the annular part 22, which, at the end remote from the tool 15, is overlapped by an axial stop in the form of an annular shoulder 43. In this way, the flange 16, together with the cylindrical sleeve 42 on the annular part 22, is secured against loosening in the axial direction away from the annular part 22. The flange 16 and the annular part 22 are held together by means of the cylindrical sleeve 42.

Furthermore, the clamping fixture has at least one detachable locking device 44 via which the flange 16, in the position which is shown in FIG. 2 and in which the tool 15 is clamped in place, is secured in a positive-locking manner with regard to the annular part 22. The locking device 44 has a tongue 45 which, with one end, is fixed by means of screw 46 to the annular part 22, and in fact on the side which points towards the flange 16. The tongue 45 is directed roughly radially. It acts roughly like a spring leaf and is in addition pressed down by means of a spring 47 in the form of a cylindrical coil spring in FIGS. 2 and 3. To mount and center the end of the spring 47, the tongue 45 contains a sunk portion 48. The spring 47 acts at a relatively large radial distance from the fixing point of the tongue 45 by the screw 46. With regard to the cross-sectional thickness, the tongue 45 is dimensioned in such a way that it is bent down like a spring tongue in FIGS. 2 and 3 under the action of the relaxing spring 47 and can be bent up in the opposite direction thereto by means of manual actuation with the spring 47 being compressed. It will be understood that this tongue 45 can also be formed, e.g. bent, in such a way that, in the position shown in FIG. 2 and moved down in the axial direction, it is stress-free and relieved, and can be raised axially upwards against the action of the spring 47 into the position shown in FIG. 3.

The tongue 45 is mounted in a recessed portion 49 which runs in the base area of the catch recess 39 and, in the area of the spring 47, is provided with a cavity 50 accommodating and centering this end.

The width of the tongue 45 and the stop dog 36 together is selected so as to be approximately as large as the overall width of the catch recess 39 so that, in the clamped state of the tool 15 according to FIG. 2, the stop dog 36 and the tongue 45 find space next to one another inside the catch recess 39. In the position of the flange 16 in which the tool 15 is clamped in position, the tongue 45 thus engages into the catch recess 39, and in fact between its step surface 34 and the locking surface 35 of the stop dog 36. In this way, the tongue 45, in this position (FIG. 2), ensures that the stop dog 36, with its engaging surface 37, bears against the driving surface 38 of the annular part 22. If the spindle 10 is driven in the working direction according to arrow 25 and the annular part 22 is thus driven in the same way, the latter also drives the flange 16 along via the driving surface 38, which strikes against the engaging surface 37 of the stop dog 36. As a result, the annular part 22 and the flange 16 are slid up along the sloping surfaces 32, 33 and are thereby thrust apart axially. This axial expanded position (FIG. 2) is secured by the tongue 45, even if, for example, the motor of the power hand tool is switched off and the spindle 10 is thus stopped relatively suddenly, while the flywheel moment, still acting on the tool 15, in the same direction according to arrow 25 could tend to rotate the tool 15 together with the two flanges 16, 17 and relative to the annular part 22 in the drive direction according to arrow 25, resulting in undesired loosening of the tool 15. This is prevented by the tongue 45, which supports the stop dog 36 with regard to the step surface 34.

In addition, if no tool 15 is mounted, the spring 26 also causes the flange 16 and the annular part 22 to rotate relative to one another in such a way that both parts slide up on the sloping surfaces 32, 33 and are thereby thrust apart axially.

If the tool 15 is to be removed and changed, the annular part 22 is rotationally locked via suitable means, which can be done by appropriate locking of the spindle 10, e.g. by means of a spindle-locking device integrated in the powered hand tool. The friction in the gearing and up to the motor may possibly also be sufficient to prevent the spindle 10 from rotating at least within limits in the direction of the arrow 25. Here, by taking hold of the end of the tongue 45 which can be gripped from outside, one hand lifts the tongue 45 against the action of the spring 47 into the position shown in FIG. 3 in which the tongue 45 moves into the recessed portion 49, which is deep enough for the tongue 45 to now release the stop dog 36, which, with its axially facing end, can travel over the tongue 45. The tool 15 is then rotated by hand in the same direction according to arrow 25, that is, anti-clockwise. In the process, the flange 17 and the flange 16 are also driven along via the friction. The rotation of the flange 16 in this direction causes its sloping surfaces 33 to slide towards the wedge bottom of the sloping surfaces 32 of the rotationally locked annular part 22, this sliding movement, because of the rolling bodies 40, turning into a rolling movement having reduced rolling friction. During this relative rotation of the flange 16 with regard to the annular part 22 towards the wedge bottom of the sloping surfaces 32, the flange 16 moves axially in the direction of the annular part 22, which leads to a corresponding axial relaxation. The clamping nut 18 can thereupon be easily unscrewed completely by hand. The sliding movement of the flange 16 with the sloping surfaces 33 towards the wedge bottom of the sloping surfaces 32 is limited by the locking surfaces 35 on one side of the stop dogs 36 striking against the step surfaces 34 on the allocated side of the respective catch recess (FIG. 3). As soon as the releasing torque is reduced to zero when the tool 15 is being released, the spring 26 is able to rotate the flange 16 relative to the annular part 22 so that the sloping surfaces 33 of the flange 16 slide towards the wedge top on the sloping surfaces 32 of the annular part 22, and the two parts 16, 22 are again thrust apart axially. This movement is limited by the stop dogs 36, with their engaging surfaces 37, striking against the respectively allocated driving surfaces 38 of the respective catch recess 39. Each stop dog 36 is then located in the position according to FIG. 2 in which the tongue 45, blocked beforehand by means of the stop dog 36, can automatically move out of the recessed portion 49 and snap into the intermediate space between each step surface 34 and locking surface 35 under the action of the relaxing spring 47. This thrust-apart position is thus secured in a positive-locking manner. In this position, a new tool 15 can be inserted and clamped in place. In the process, it is sufficient for the clamping nut 18 to be screwed down gently and thus for the new tool 15 to be gently tightened, since, when the motor is subsequently switched on, the tool 15 tightens automatically in operation.

The rolling bodies 40 arranged between the sloping surfaces 32, 33 resting on one another have the advantage that the face friction present between the two is reduced to a rolling friction and is thus virtually negligibly small.

The clamping fixture described is simple, cost-effective and quick, safe and easy to handle. It enables the tool 15 to be quickly and safely changed without requiring additional special tools for this purpose. A further advantage is that existing power hand tools, in particular grinding power tools, can also be subsequently equipped with this clamping fixture without considerable further redesign. For this purpose, only the existing rear flange, in general, needs to be exchanged for the unit which consists of the annular part 22 and flange 16, held together via the cylindrical sleeve 42. In the process, the, e.g. standardized, clamping nut 18 present in other machines will be retained unchanged, as will a rotationally fast, positive-locking connection between the part supporting the tool 15 and the spindle 10. Thus corresponding relevant regulations are complied with. It is also possible in particularly stubborn cases, e.g. in the slightly rusted state, to loosen the clamping nut 18 in a conventional manner by means of an auxiliary tool. The clamping fixture is not restricted to grinding discs as tool 15. On the contrary, other tools, e.g. cup wheels, brushes, rubber plates or the like can also be clamped without a tool.

While the invention has been illustrated and described as embodied in a clamping fixture for detachably fixing a disc-like tool, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A clamping fixture for detachably fixing a disc-like tool to a spindle in cooperation with a tool-fixing member, said clamping fixture comprising a flange member for clamping the tool between said flange member and the tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface of said annular part, said second end surface of said annular part and said end surface of said flange member having a plurality of complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool is clamped between said flange member and tool-fixing member, for joint rotation with said annular part, said clamping fixture further comprising a detachable locking device for securing said flange member to said annular part of said supporting element in a positive-locking manner in a position of said flange member in which said flange member is ready to clamp the tool, said locking device including a substantially radially extending resilient tongue movable between an inactive position and a locking position and formed so that it is moved to said locking position automatically under a spring action.

2. A clamping fixture according to claim 1, wherein each of said plurality of stop dogs has a surface located opposite said locking surface and defining a surface engageable by a respective drive surface.

3. A clamping fixture according to claim 1, wherein said rolling bodies are balls.

4. A clamping fixture according to claim 1, wherein said axial stop is formed as an annular shoulder.

5. A clamping fixture for detachably fixing a disc-like tool to a spindle in cooperation with a tool-fixing member, said clamping fixture comprising a flange member for clamping the tool between said flange member and the tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface of said annular part, said second end surface of said annular part and said end surface of said flange member having a plurality of complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool is clamped between said flange member and the tool-fixing member, for joint rotation with said annular part, said clamping fixture further comprising a detachable locking device for securing said flange member to said annular part of said supporting element in a positive-locking manner in a position of said flange member in which said flange member is ready to clamp the tool, said annular part having a plurality of catch recesses corresponding in number to the number of sloping surfaces and adjoining said sloping surfaces, respectively, at the lower ends thereof, said catch recesses extending axially, being open toward said end surface of said flange member, and having opposite end faces defining said stop and drive surfaces, respectively.

6. A clamping fixture for detachably fixing a disc-like tool to a spindle in cooperation with a tool-fixing member, said clamping fixture comprising a flange member for clamping the tool between said flange member and the tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface of said annular part, said second end surface of said annular part and said end surface of said flange member having a plurality or complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool is clamped between said flange member and the tool-fixing member, for joint rotation with said annular part, said clamping fixture further comprising a detachable locking device for securing said flange member to said annular part of said supporting element in a positive-locking manner in a position of said flange member in which said flange member is ready to clamp the tool, said annular part having a substantially inverted pot-shaped cross-section, including a cylindrical portion having an end surface facing said flange member and defining said end surface thereof on which said sloping surface portions are formed, said cylindrical portion having a wall having a plurality of apertures defining, respectively, said plurality of catch recesses.

7. A clamping fixture for detachably fixing a disc-like tool to a spindle in cooperation with a tool-fixing member, said clamping fixture comprising a flange member for clamping the tool between said flange member and the tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface of said annular part, said second end surface of said annular part and said end surface of said flange member having a plurality of complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool s clamped between said flange member and the tool-fixing member, for joint rotation with said annular part, said clamping fixture further comprising a detachable locking device for securing said flange member to said annular part of said supporting element in a positive-locking manner in a position of said flange member in which said flange member is ready to clamp the tool; and a plurality of recessed grooves arranged between said second end surface of said annular part and said end surface of said flange member, and a respective plurality of rolling bodies located in said recessed grooves.

8. A clamping fixture for detachably fixing a disc-like tool to a spindle in cooperation with a tool-fixing member, said clamping fixture comprising a flange member for clamping the tool between said flange member and tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface of said annular part, said second end surface of said annular part and said end surface of said flange member having a plurality of complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool is clamped between said flange member and the tool-fixing member, for joint rotation with said annular part, said clamping fixture further comprising a detachable locking device for securing said flange member to said annular part of said supporting element in a positive-locking manner in a position of said flange member in which said flange member is ready to clamp the tool; and a cylindrical sleeve, said flange body being fixed within said cylindrical sleeve, said cylindrical sleeve having an axial stop for engaging said annular part to prevent its loosening in an axial direction toward the tool.

9. A clamping fixture for detachably fixing a disc-like tool to a spindle in cooperation with a tool-fixing member, said clamping fixture comprising a flange member for clamping the tool between said flange member and the tool-fixing member; a supporting element for attaching said flange member to the spindle in a torque-transmitting relationship and having an annular part; and a torsion spring having two ends attached to said flange member and said annular part, respectively, for coupling said flange member with said annular part for relative axial and rotational displacement therebetween, said annular part having a first end surface to be axially supported on the spindle and a second end surface, and said flange member having an end surface bearing on said second end surface or said annular part, said second end surface of said annular part and said end surface of said flange member having a plurality of complementary sloping end surface portions inclined toward the spindle axis and defining a wedge angle having a size lying in a self-locking range, said annular part including a plurality of stop surfaces corresponding in number to a number of sloping end surface portions thereof and extending substantially parallel to the spindle axis with each stop surface adjoining a respective sloping end surface portion of said second end surface at a lower end of said respective sloping end portion and a plurality of drive surfaces corresponding in number to a number of sloping end surface portions of said annular part, extending parallel to respective stop surfaces in spaced relationship thereto with each drive surface arranged in front of an upper end of a respective sloping end portion of said second end surface, said flange member having a respective plurality of stop dogs extending parallel to the spindle axis at lower ends of respective sloping end surface portions of said flange member and defining each a locking surface engaging a respective stop surface of said annular part upon the axial displacement of said flange member and relief of the clamping pressure whereby rotation of said member relative to said annular part is limited, and a respective plurality of surfaces engageable by respective drive surfaces of said annular part when the tool is clamped between said flange member and the tool-fixing member, for joint rotation with said annular part, said clamping fixture further comprising a detachable locking device for securing said flange member to said annular part of said supporting element in a positive-locking manner in a position of said flange member in which said flange member is ready to clamp the tool, said locking device including a substantially radially extending resilient tongue received in one of said catch recesses of said annular part between a respective stop surface and a respective stop dog received in said one catch recess in the position of said flange member in which said flange member is ready to clamp the tool to secure said flange member to said annular part for joint rotation, said resilient tongue, in inactive position, of said locking device, being movable axially towards said part and out of a path of said respective stop dog to release said respective stop dog, said resilient tongue overlapping said stop dog in a peripheral direction in the inactive position of the locking device.

10. A clamping fixture according to claim 5, wherein each of said catch recesses has a width measured in a peripheral direction, each of said stop dogs being received in a respective catch recess and having a width which is less than the width of the respective catch recess.

11. A clamping fixture according to claim 1, wherein said annular part has a substantially inverted pot-shaped cross-section, including a cylindrical portion having an end surface facing said flange member and defining said end surface thereof on which said sloping surface portions are formed.

* * * * *